US005660305A

United States Patent [19]

Lasher et al.

[11] Patent Number: 5,660,305

[45] Date of Patent: Aug. 26, 1997

[54] AUTOMATIC PRESCRIPTION DISPENSING SYSTEM

[75] Inventors: Christopher J. Lasher, Ridgewood; Dennis Wayne Rice, Union; Michael Joseph Szesko, Freehold, all of N.J.

[73] Assignee: Medco Containment Services, Inc., Montvale, N.J.

[21] Appl. No.: 455,398

[22] Filed: May 31, 1995

Related U.S. Application Data

[63] Continuation of Ser. No. 285,035, Aug. 2, 1994, abandoned.

[51] Int. Cl.[6] ........ B65G 59/00

[52] U.S. Cl. ........ 221/206; 221/124; 221/2; 221/9; 221/93; 53/501; 53/390; 53/168; 53/492

[58] Field of Search ........ 221/2, 7, 9, 12, 221/92, 93, 94, 123, 124, 130, 131, 206, 207; 53/501, 505, 473, 390, 168, 492, 381.1

[56] References Cited

U.S. PATENT DOCUMENTS

| | | | |
|---|---|---|---|
| 3,139,713 | 7/1964 | Merrill et al. | 53/55 |
| 3,677,437 | 7/1972 | Haigler | 221/7 |
| 4,013,192 | 3/1977 | Pillon | 221/7 |
| 4,018,358 | 4/1977 | Johnson et al. | 221/7 |
| 4,112,332 | 9/1978 | Veith et al. | 315/169 |
| 4,171,065 | 10/1979 | Hurst | 221/2 |
| 4,674,259 | 6/1987 | Hills | 53/202 |
| 4,695,954 | 9/1987 | Rose et al. | 364/413 |
| 4,847,764 | 7/1989 | Halvorson | 364/413 |
| 4,869,894 | 9/1989 | Hurst | 221/7 |
| 4,953,745 | 9/1990 | Rowlett, Jr. | 221/5 |
| 5,208,762 | 5/1993 | Charhut et al. | 221/9 |
| 5,337,919 | 8/1994 | Spaulding et al. | 221/2 |
| 5,348,061 | 9/1994 | Riley et al. | 221/2 |
| 5,401,059 | 3/1995 | Fernario | 221/2 |

*Primary Examiner*—William E. Terrell
*Assistant Examiner*—Khoi H. Tran

[57] ABSTRACT

In an automatic prescription dispensing system, a multiplicity of pill dispensers dispensing the pills of different prescriptions are arranged in columns and rows. A conveyer organizes open and labeled pill bottles in columns corresponding to the columns of the pill dispensers and carries the columns of pill bottles severally past and beneath the pill dispensers in the array. The pill bottles are carried in bottle carriers which in turn are carried by pallets on a conveyer. When a pill bottle gets to a pill dispenser containing the pills to be dispensed for the prescription of a pill bottle, the pills are released from the dispenser into the pill bottle, whereby a plurality of pill bottles passing under the array of dispensers are filled simultaneously. The pill dispensers count the pills out one at a time and accumulate the pills of a prescription before the pill bottle to receive such prescription reaches the dispenser and then releases the pills en masse into the pill bottle.

16 Claims, 6 Drawing Sheets

AUTOMATIC PRESCRIPTION DISPENSING SYSTEM

This is a continuation of application Ser. No. 08/285,035, filed Aug. 2, 1994 abandoned.

BACKGROUND OF THE INVENTION

This invention relates to an automatic prescription dispensing system and, more particularly, to a system in which prescription data regarding individual prescriptions to be filled are assembled in a computer, which controls automatic pill dispensers to dispense prescriptions into prescription labeled pill bottles.

In mail service pharmacies and large retail pharmacies, prescription drugs are dispensed in a high volume and the work of filling the prescriptions by current methods is labor intensive and expensive. There is a need for an automatic pill dispensing system to carry out the dispensing of the prescription drugs automatically at a rapid rate and to label pill containers which can then be provided to the patient for whom the prescriptions were written.

Automatic pill dispensing systems have been proposed in the past, but the prior systems are slow and fail to deliver filled prescriptions at a rapid rate. Some prior art systems are subject to a problem of cross contamination of the filled prescriptions and some require substantial numbers of personnel to operate the system.

SUMMARY OF THE INVENTION

The present invention improves over the prior art automatic dispensing systems by arranging a large number of pill dispensers into an array assembled with a conveyer which delivers labeled pill bottles to the pill dispensers in a plurality of columns.

In the preferred embodiment, the conveyer provides a plurality of conveyer lanes and each conveyer lane carries the pill bottles in a plurality of columns past a large array of dispensers arranged in columns and rows. For each conveyer lane, the array of dispensers is arranged into a plurality of "loaves" each of which is made up of twelve "slices" of pill dispensers. Each slice comprises twelve pill dispensers having output conduits arranged in four columns and three rows. In each slice, six pill dispensers are arranged on each side of the conveyer lanes, which carry the bottles in four columns through the slice beneath the output conduits of the twelve pill dispensers. The pill dispensers count out pills from a supply hopper into an upper receiving hopper called an upper buffer. When the correct number of pills called for in a prescription have been courted out by the dispenser into the upper buffer, they are released into a lower output hopper called a lower buffer. When the pill bottle containing a prescription label reaches the dispenser containing the pills called for on that prescription label, the number of the pills called for in the prescription will already be accumulated and waiting in the lower buffer. Accordingly, the pill bottle needs to pause only long enough for the accumulation consisting of the number of pills called for in the prescription to be released en masse from the lower buffer into the pill bottle. The pills are released from the lower buffer by opening a gate closing a bottom opening of the lower buffer and are directed through an output conduit in the form of a vertical outlet tube into the open bottle beneath the lower opening of the output tube. It will be appreciated that in the system as described, several pill bottles including some in the same column may reach the pill dispensers selected to release the pills for the corresponding pill bottles simultaneously, in which case these pill bottles will be filled simultaneously.

In the system as described above, an open pill bottle will pass under many pill dispensers containing pills other than those called for in the prescription label of the bottle. To prevent stray pills from falling into the wrong bottles, a second gate called a safety gate is provided closing the lower end of the outlet tube. This safety gate is opened at the same time that the lower buffer gate is opened to release the pills from the lower buffer into the outlet tube.

Figure 6A:
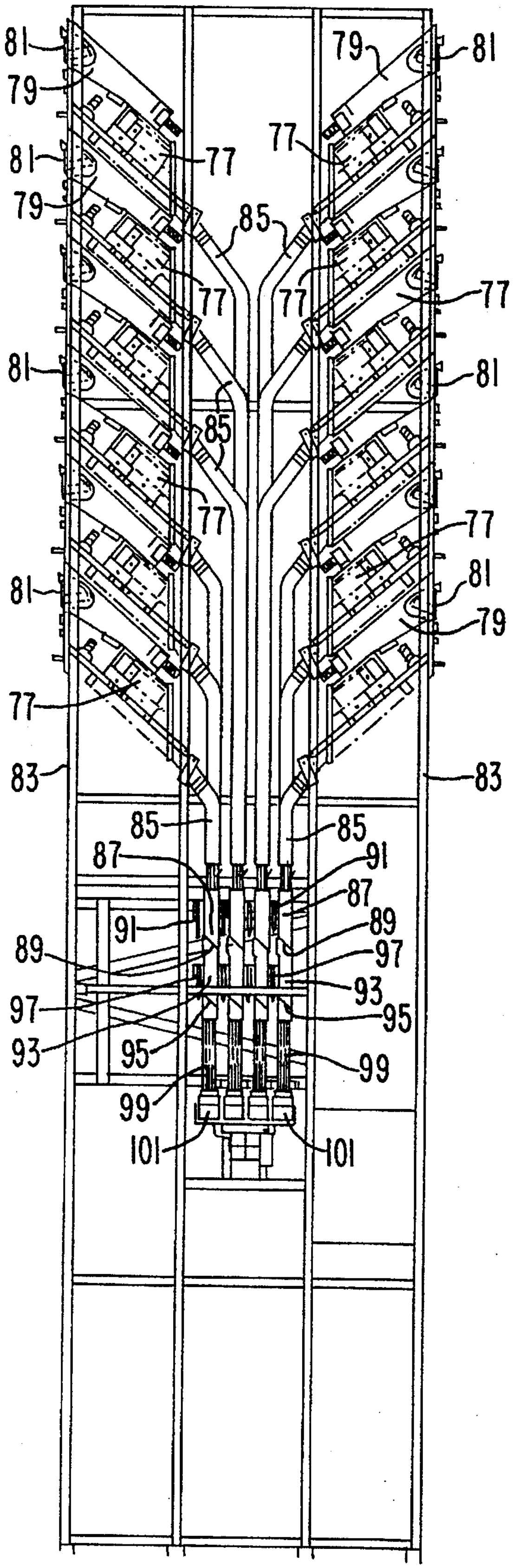

FIG. **6*a*** is a partial sectional view in elevation showing a slice of the automatic dispenser system assembled over a conveyer lane carrying columns of pills through the slice;

FIG. **6*b* is an enlargement of a portion of FIG. 6*a***; and

Figure 7:
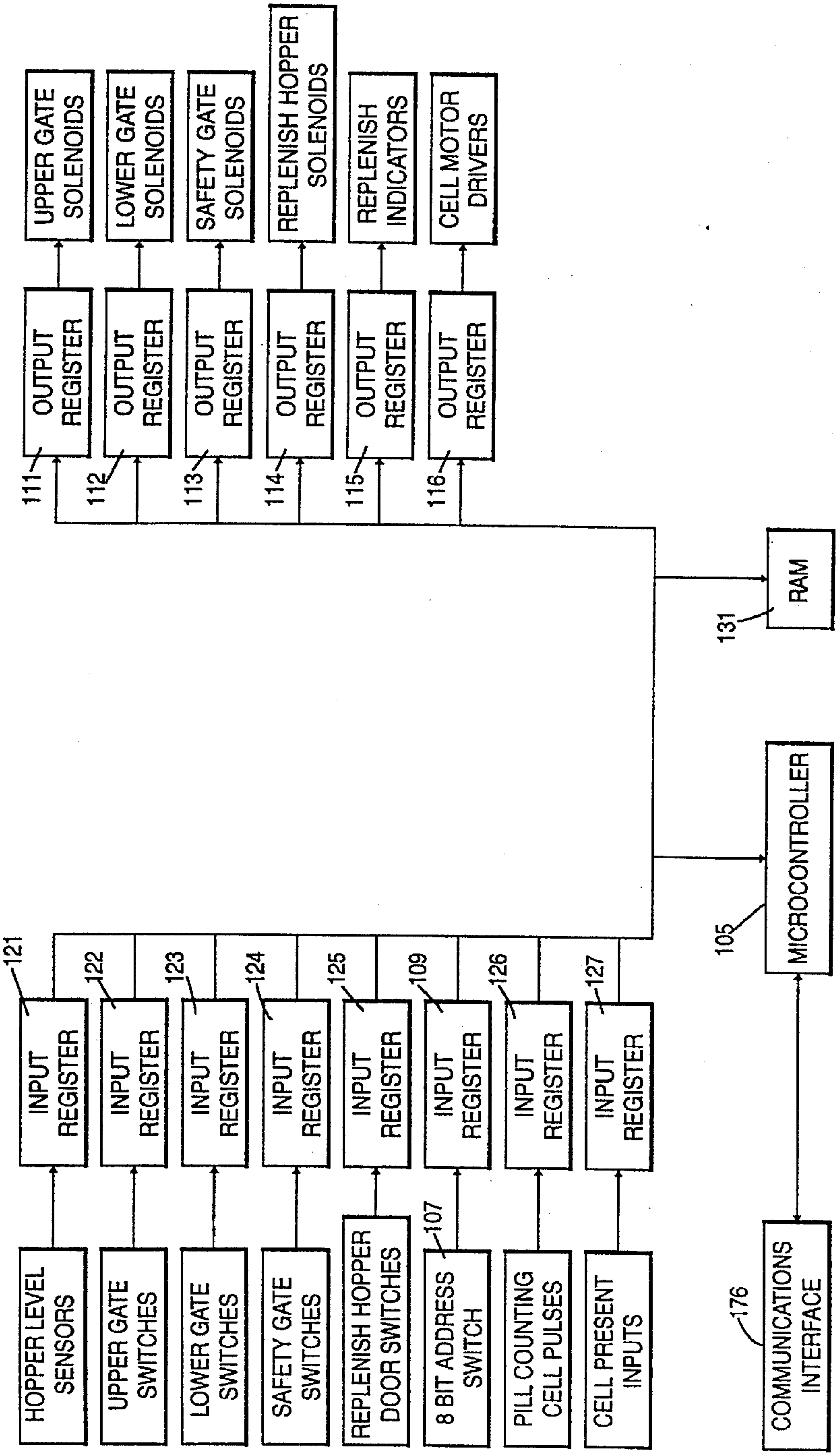

FIG. 7 is a block diagram of a slice I/O board for controlling six dispensers on one side of a conveyer lane comprising half of a slice of twelve dispensers.

DESCRIPTION OF A PREFERRED EMBODIMENT

Figure 1:
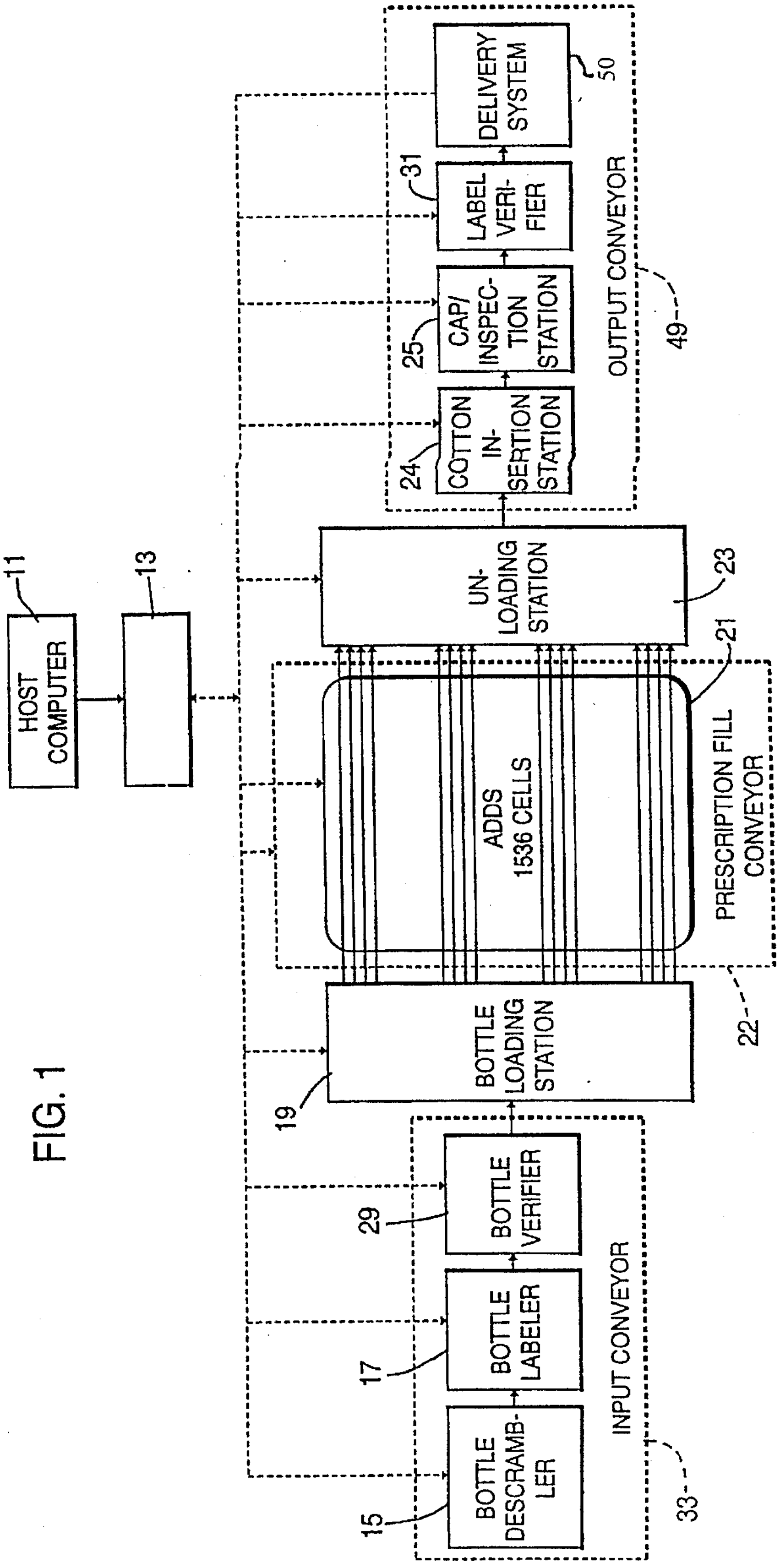
FIG. 1 is a block diagram schematically illustrating the automatic dispensing system of the present invention.

In the system of the invention, as shown in FIG. 1, prescription information containing information on prescriptions to be filled is downloaded from the host computer 11 to a control computer 13, which controls the automatic drug dispensing system of the invention. The control computer 13 controls a bottle descrambler 15, a bottle labeler 17, a bottle loading station 19, an automatic drug dispensing system 21 (ADDS), a prescription fill conveyer 22, a prescription bottle unloading station 23, the cotton inserting station 24, and a bottle capping and inspecting station 25. The control computer 13 receives bottle verification information from a prescription verifier 29 on the input side of the prescription conveyor 22 and a prescription label verifier 31 on the output side of the prescription fill conveyer 22.

The bottle descrambler 15 functions to organize and position the prescription bottles one at a time on a conveyer 33. Bottle descramblers are available on the market and one example of such a descrambler is Model No. M300 sold by Price Packaging Corp. of Fairfield, N.J. The conveyer 33 carries the bottles one at a time to the bottle labeler 17, which prints prescription labels in accordance with the prescriptions received by the control computer 13 from the host computer 11 and applies the labels to the bottles on the conveyer 33. The bottle labeler 17 is a conventional piece of equipment available on the market from several manufacturers including Video Jet Systems International, Inc. of Wood Dale, Ill. and Labelling Systems, Inc. of Mahwan, N.J. The conveyer 33 carries the labeled bottles one at a time from the bottle labeler 17 to the prescription bottle label verifier 29, which reads a bar code printed on the prescription label, applies signals representing this bar code back to the computer 13 to identify and verify the prescription on each bottle. The prescription bottle verifier comprises a bar code scanner and is a conventional piece of equipment and may be purchased from Laser Data Corporation of Sanford, Fla. From the prescription label verifier 29, the bottles are carried by the conveyer 33 one at a time to the bottle loading station 19 which, under the control of the computer 13, receives the labeled prescription bottles from conveyer 33 and places the bottles in selected locations in bottle carriers mounted on pallets. Each bottle carrier, having a place for 12 pill bottles, is mounted on a separate pallet designed to be carried along by the conveyer 22 and the bottles are arranged in a 3×4 array in a bottle carrier so that the bottles will be carried by the bottle carriers in four columns with each bottle carrier having three rows of bottles.

As explained above, the bottle carriers, mounted on pallets, organize the bottles into four columns which approach the automatic drug dispensing system 21. The conveyer 22 may be organized into a plurality of parallel conveyer lanes, each transporting a column of pallets to ADDS 21. FIG. 1 shows four conveyer lanes, each containing four columns of pill bottles approaching the ADDS 21 so that 16 parallel columns of pill bottles approach the ADDS.

Figure 3:
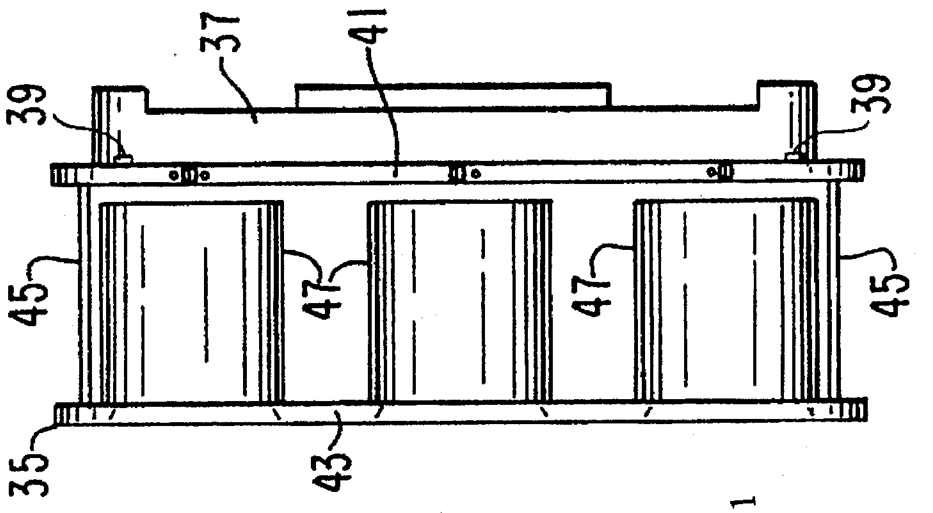
FIG. 3 is a side view in elevation of the bottle carrier of FIG. 2 assembled on a conveyer pallet.
Figure 2:
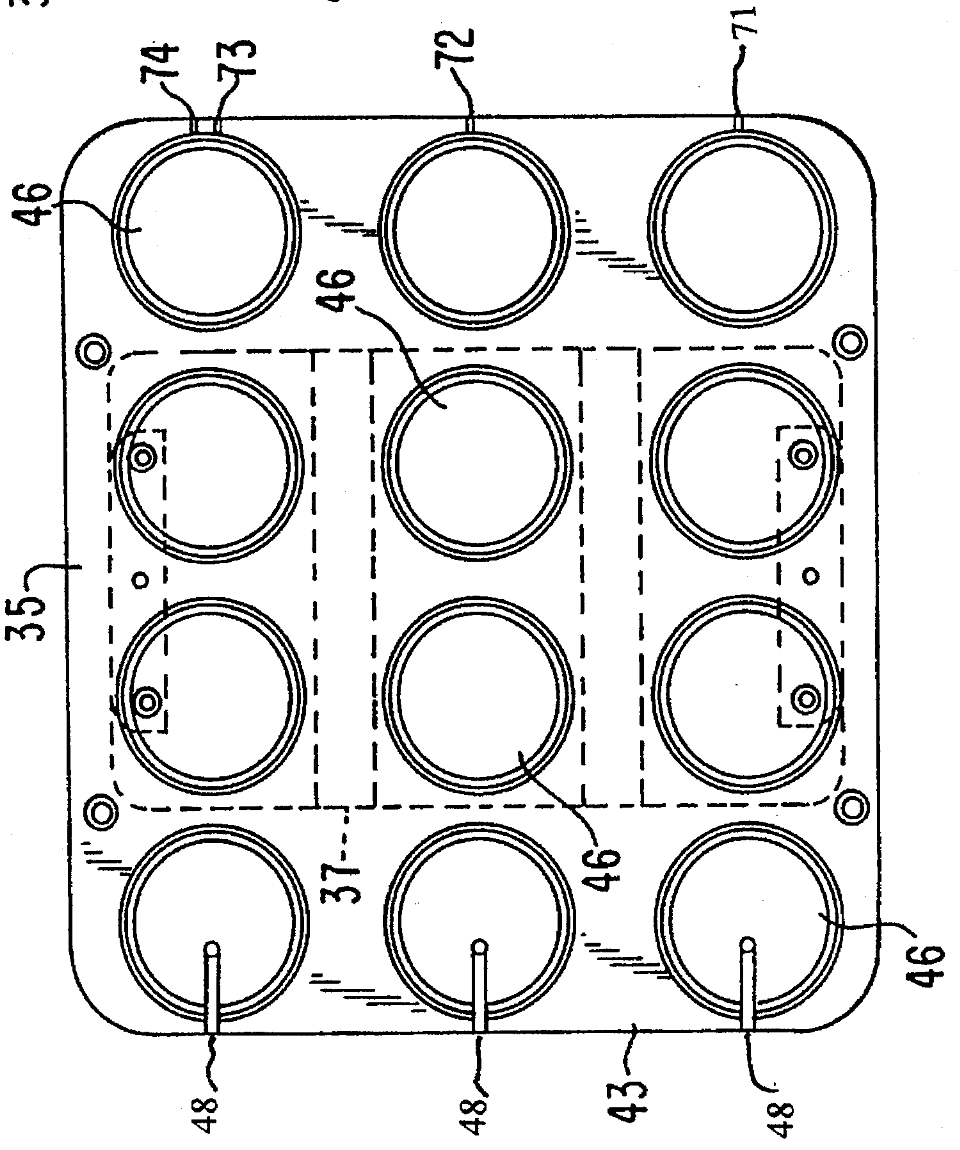
FIG. 2 is a plan view in elevation of a pill bottle carrier which is mounted on a pallet designed to be carried by a conveyer employed in the system of the invention.

As shown in FIG. 2 and FIG. 3, a bottle carrier 35 is mounted on a pallet 37 by means of fasteners 39. The bottle carrier 35 comprises a lower plate 41 resting on the upper surface of the pallet 37 and an upper apertured plate 43 mounted on the lower plate 41 by posts 45. The upper apertured plate 43 has 12 apertures 46 sized to receive pill bottles and beneath each aperture is a hollow cylindrical housing 47 which is open at both ends. Pill bottles may be placed in the bottle carrier 35 by being dropped through the apertures 46 into the cylindrical housings 47 with the bottom of each pill bottle resting on the bottom plate 41 of the bottle carrier.

The bottle loading station 19 fills the bottle carriers 35 with labeled pill bottles received from the prescription bottle label verifier 29. Each row of bottle positions in a set of bottle carriers mounted on pallets on the prescription fill conveyer 22 is uniquely identified by a row identification code provided by a radio tag 48 mounted opposite each row on each bottle carrier. The bottle loading station 19 reads the bar code on each prescription bottle and the row identification code from the radio tag opposite each row in the bottle carrier being filled and applies this data to the computer 13, which stores the row identification code in association with the prescription identifications obtained from the bar codes on the prescription bottles for those bottles placed in the corresponding bottle carrier rows. The radio tags and the readers for reading the radio tags are marketed by Texas Instruments, Inc. under the name TIRIS.

Under the control of the computer 13, the bottle loading station 19 must place each labeled prescription bottle in a selected one of the 16 columns of bottles so that each prescription bottle will eventually reach a pill dispenser containing a prescription identified on the label of the bottle.

In the preferred embodiment as shown in FIG. 1, the ADDS 21 has 1,536 pill dispensers and the conveyer 22 carries the pallets containing the bottle carriers, which in turn contain the open prescription bottles, through the ADDS 21 where the prescriptions are dispensed directly and automatically into the prescription bottles. After prescriptions have been filled by the ADDS 21, the conveyer 22 carries the bottles to the prescription unloading station 23 which removes the bottles from the bottle carriers and places the bottles, which are still at that point open, on a prescription out conveyer 49. The unloading station reads the radio tag on each bottle carrier and the bar code on each prescription bottle and sends this data to the computer 13 for verification. The conveyer 49 carries the bottles one at a time to a cotton inserting station 24, which inserts a wad of cotton into each prescription bottle on the conveyer. Following cotton insertion, the conveyer 49 carries the bottle to a capping and inspection station 25, which applies a cap to the bottle and inspects the bottle for defects. The cotton inserting station and capping and inspection station are implemented by conventional pieces of equipment available on the market. After capping and inspection, the bottle is carried to the prescription label verifier 31, which scans the bar code on the bottle to again verify the bottle has the correct prescription. After verification by the prescription label verifier 31, the conveyer 49 carries the bottles to the delivery system 50, from which the bottles are delivered to the patient.

The prescription fill conveyer 22 is available from SKF Handling Systems Company of Bethlehem, Pa. sold under the trademark FLEX-LINK and identified by Model No. XL. The prescription fill conveyer system comes with the pallets 37, on which the bottle carriers 35 are mounted. The conveyer system is provided with pneumatic stop cylinders, which when actuated, raise a plunger to engage a pallet on the conveyer to stop the pallet in a selected position. These cylinders are used to stop the pallets in positions to place the prescription bottles under prescription dispensers in the ADDS.

Figure 4:
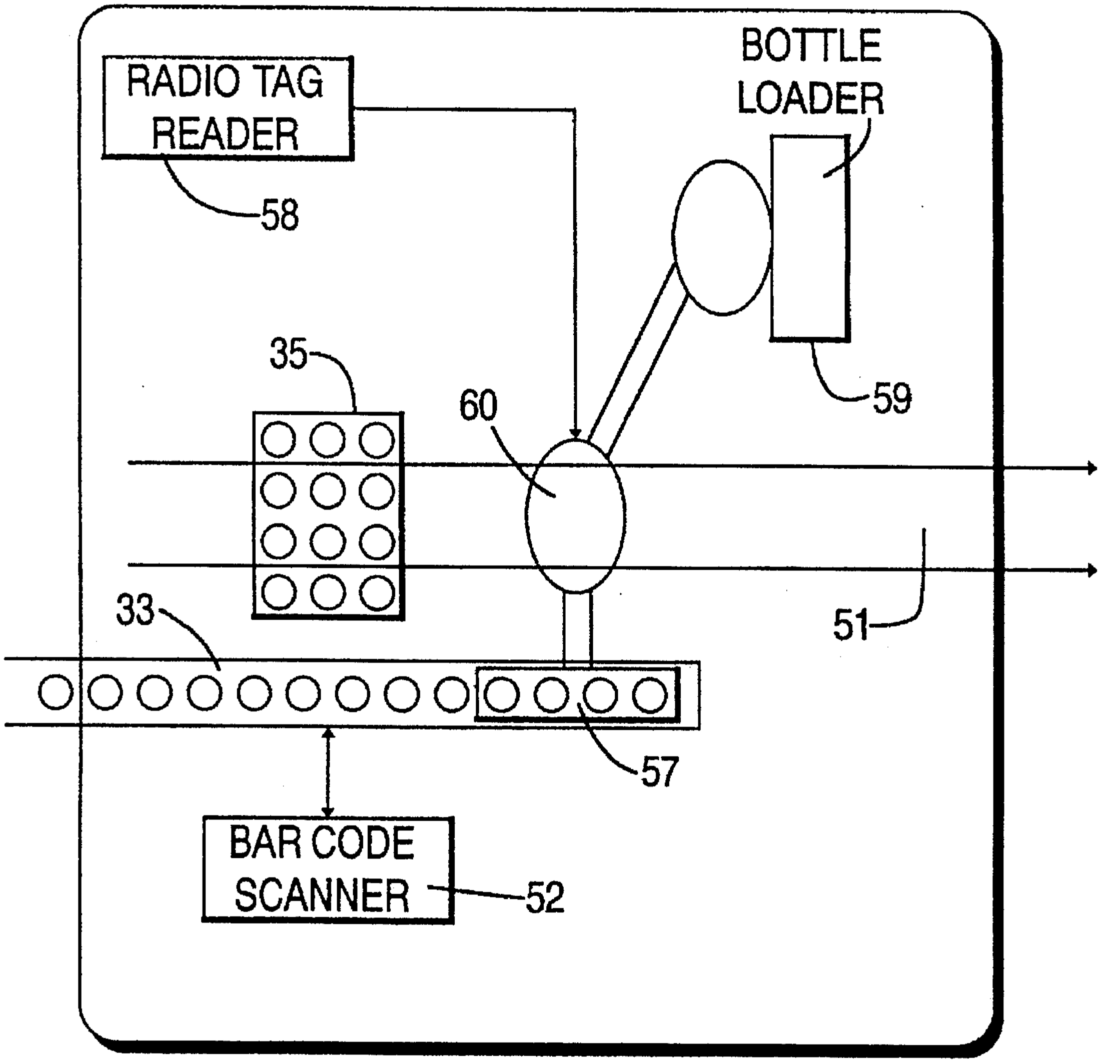
FIG. 4 is a schematic illustration of a loading station used in the system of the present invention to load pill bottles into the bottle carriers carried by the conveyers.

FIG. 4 schematically illustrates the portion of the loading station 19 operating on one conveyer lane. As shown in FIG. 4, a bar code scanner 52 reads the bar codes on each prescription bottle as the prescription bottle approaches a loading gate 57 on input conveyer 33 and the prescription identification read by the bar code scanner 52 is to be stored by the computer 13. After processing by the bar code scanner 52, the pill bottles are accumulated in a loading gate 57. In the meantime, a conveyer lane 51 will bring an empty bottle carrier 35, on a pallet to a loading position 60. When the loading gate 57 has received four pill bottles, a bottle loader 59 will place the four pill bottles in the first row of the bottle carrier 35. The bottle loader 59 also loads pill bottles from the loading gate into bottle carriers on the other three conveyer lanes, not shown in FIG. 4. A radio tag reader 58 will read the radio tag opposite the first row of the bottle carrier 35 being loaded with pill bottles and the computer 13 will store this row identification read by the radio tag reader 58 in a bottle position data file associated with the four prescription identifications for the four bottles placed in the first row of the bottle carrier 35. The bottle carrier 35 under the control of stop cylinders of the conveyer system is allowed to advance one position and the process is repeated for the next row in the bottle carrier. After three rows of the bottle carriers have been loaded with pill bottles, the bottle loading station 19 releases the bottle carrier to be carried by the conveyer lane 51 to the ADDS 21.

Table I illustrates a portion of the bottle position data file from one bottle carrier.

TABLE I

| Row Identification | Column A | Column B | Column C | Column D |
|---|---|---|---|---|
| 101 | aa | ab | ac | ab |
| 102 | ae | af | ag | ah |
| 103 | ai | aj | ak | al |

In Table I, the row identifications are 101, 102, and 103 and the prescription identifications are aa through al. The columns in the bottle carrier are identified as columns A through D. As shown in Table I, the bottle position file is organized to associate each prescription identification with the row identification of the row in which the corresponding pill bottle is placed as well as to indicate in which column of the bottle carrier the prescription is placed.

The ADDS 21 is similar to the enhanced drug dispensing system (EDDS) described in copending application Ser. No. 08/250,435, filed May 27, 1994, which is hereby incorporated by reference. In the EDDS system as described in the above-mentioned copending application, the dispensing system is divided into slices each containing six pill dispensers. The present system differs from the EDDS system in that each slice contains 12 pill dispensers oriented six on each side of a conveyer lane. The slices of the system of the present invention are organized into a loaf of 8 slices at successive positions along a lane of the prescription fill conveyer 22 and each conveyer lane passes through 4 loaves in succession.

Figure 5:
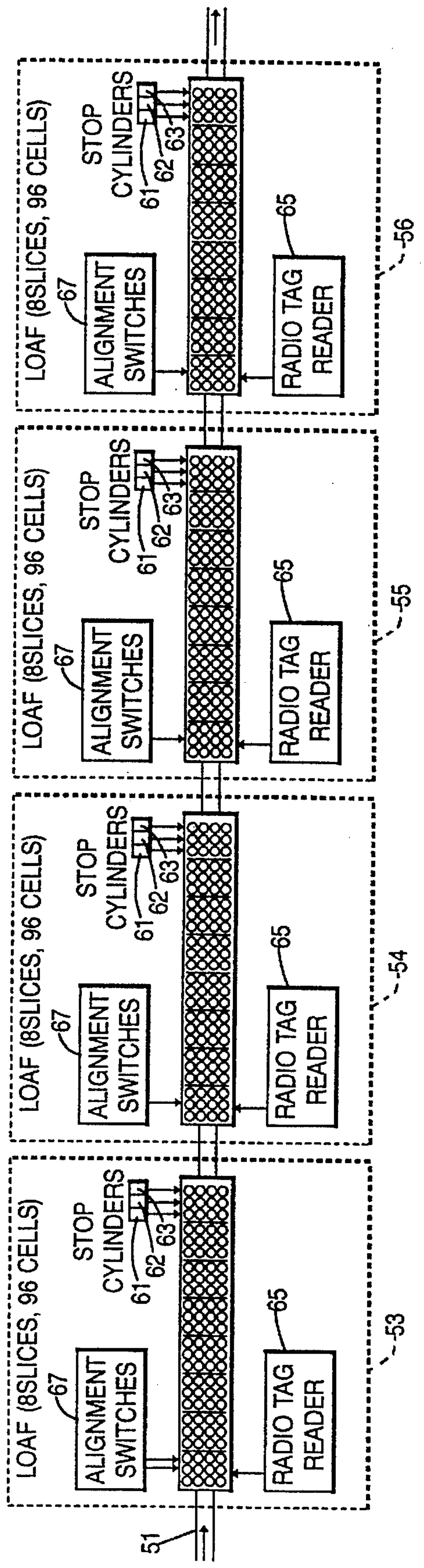
FIG. 5 is a schematic illustration of a conveyer lane assembled with four loaves of pill dispensers.

FIG. 5 schematically illustrates conveyer lane 51, and the four loaves 53–56 through which the conveyer lane 51 carries the pallets with bottle carriers mounted thereon carrying prescription bottles. Since each loaf contains eight slices for each conveyer lane, each loaf will contain 96 dispensers arranged in 24 rows, each slice containing three rows. Three stop, cylinders 61–63 are positioned to stop the last pallet passing through each loaf at the last three dispenser rows in the last slice of the loaf. The stopping of the pallet in each of the last three row positions by the three stop cylinders 61, 62 and 63 will cause the remaining pallets in the loaf to also stop since they will abut against the preceding stopped pallet. At each position in which pallets are stopped, all of the pill bottles in the loaf will be aligned under a pill dispenser. The pallets are stopped simply by the cylinder raising an arm and engaging a pallet which causes the pallet to slide on the conveyer belt and the remaining pallets in the loaf will be stopped and will also slide on the conveyer. In this manner, the cylinders 61–63 stop eight pallets in selected row positions and index each of the pallets through three row positions in each slice. Accordingly, each row of bottles is successively brought under each of the 24 rows of four dispensers in each loaf. Each time the set of eight pallets with bottle carriers containing pill bottles are stopped by one of the cylinders 61 and 62 or 63 in a given row position, all of the bottles which are underneath a dispenser of the ADDS 21 containing the prescription for that bottle are filled and then the bottles are indexed to the next row position. In the position shown in FIG. 5, the piston 61 has been actuated to stop the last pallet in the loaf so that its first row of bottles is opposite the last row of dispensers of the last slice in the loaf. Each of the other seven pallets in the loaf will also be stopped in the same relative position with respect to corresponding preceding slices in the loaf. When the stop cylinder 63 has been actuated to stop a pallet so that the last row of bottles on the pallet are stopped beneath the last row of dispensers in the loaf and the prescription filling has been carried out for all the bottles in this position, the piston 63 will release the last pallet in the loaf, and the pallet, which is at the last position in the loaf, instead of merely moving forward one row position, will be carried by the conveyer lane 51 into the next loaf where it will abut the preceding pallet in the next loaf.

Each of the loaves operate to fill the prescriptions in the above-described manner as the bottle carriers containing prescription bottles move through the loaves 53–56 in succession. When a pallet moves out of the last row position in the loaf 56, all the prescription bottles in the bottle carrier on that pallet should be filled and the prescription fill conveyer carries the bottle to the prescription unloading station 23. Following the removal of the filled prescription bottles by the prescription unloading station 23, the conveyer 22 returns the pallet with the bottle carrier, but now minus the prescription bottles, back to the bottle loading station 19 to receive a new set of labeled prescription bottles.

When a row of bottles enters the loaf 53 of the ADDS 21 on the conveyer lane 51, a radio tag reader 65 reads the corresponding radio tag on the bottle carrier and reads the bottle position data file to store a record in another file called the bottle tracking file. This file which is illustrated in Table II below duplicates the bottle position data file, but will store associated with row identification a row position index number, which is set to one upon the corresponding row of a bottle carrier entering the first row position of the loaf 53.

TABLE II

| Row Position Index No. | Row ID | Column A | Column B | Column C | Column D |
|---|---|---|---|---|---|
| n + 2 | 101 | aa | ab | ac | ad |
| n + 1 | 102 | ae | af | ag | ah |
| n | 103 | ai | ai | ak | al |

The position of each bottle carrier is tracked by the ADDS computer 13 by incrementing the position index number stored with the row identification as the bottle carrier advances row by row through the loaf 53. In Table II the row position index number for row identification 103 is shown as n. Accordingly, the row position index number for row identification 102, which will always be one greater than the row position index number for the row identification 103, is shown as n+1. Similarly, the row position index number for the row identification 101 is n+2. Thus, the row position index number for each row identification in the bottle tracking file is made to equal the row position in the loaf 53 under which the corresponding row of the bottle carrier is located.

This process is repeated for each of the following loaves 54 through 56 except as each bottle carrier row enters the loaf 54, the row position index number associated with the row identification for the entering row in the bottle tracking file is set to 25 to correspond to the first dispenser row number in the loaf 54. Similarly, upon a bottle carrier row entering the loaf 55, the row position index number is set to 49 to correspond to the first dispenser row number of the loaf 55. Likewise, upon a bottle carrier row entering the loaf 56, the row position index number associated with the corresponding row identification stored in the bottle tracking file is set to 73 to correspond to the row position number of the first row of dispensers in the loaf 56.

When the bottle loading station 19 loads the prescription bottles in a bottle carrier, in addition to storing the prescription identification in the bottle position data file, it also stores data in a dispenser position data file indicating where in the ADDS 21 the pill dispenser for the prescription is located by row number and column number. When a pill bottle gets to the dispenser containing the pills to be dispensed into that pill bottle in accordance with the prescription, the computer 13 determines that the pill bottle is in place by comparing the data in the bottle tracking file with the data in the dispenser position data file; that is, the row position index number indicating the current row position of the pill bottle in the bottle tracking file should be the same as the row position of the dispenser for that prescription identification in the dispenser position data file.

Alignment switches 67 coact with alignment switch actuation detents 71–74 on each bottle carrier. The actuation detent 71 is opposite the first row of bottles and will actuate one of the actuation switches 67 when the first row of bottles is opposite the last row of dispensers in the first slice of a loaf. This bottle carrier position is bottle carrier position 1. The second actuation detent 72 is opposite the second row of bottles and is positioned on the carrier to actuate the other one of the alignment switches 67 when the second row of bottles is opposite the last row of dispensers in the first slice of the loaf, but the first one of the alignment switches will not be actuated in this position. This bottle carrier position is position 2. The actuation detents 73 and 74 are positioned opposite the last row of bottles in each bottle carrier and are positioned so that both alignment switches 67 will be actuated when the third row of bottles in the bottle carrier are opposite the last row of dispensing cells in the first slice of the loaf. This bottle carrier position is position 3. Thus, when the first switch is actuated, but not the second, the bottle carriers will be in position 1 in which the first row of bottles in each carrier is opposite the last row of dispensers of a slice. When the second alignment switch 67 is actuated, but not the first, then the bottle carriers will be in position 2 in which the second row of bottles in each carrier is opposite the last row of dispensers of a slice. When both switches are actuated, then the bottle carriers will be in position 3, in which the last row of bottles in each carrier is opposite the last row of dispensers in a slice. The signals provided by the alignment switches 67 provide confirmation to the computer 13 of the position of each bottle carrier in the loaves relative to the slices. The confirmation is needed because the alignment is determined by the bottle carriers abutting against the preceding bottle carrier in the loaf and a malfunction of the system conveyer operation could cause a gap (or overlap) between bottle carriers. Since the alignment switches respond to the last bottle carrier in the loaf, they confirm the alignment of all the bottle carriers in the loaf. The alignment switches will not be actuated unless the bottle carrier is precisely aligned with the pill dispensers and the alignment switches also serve to indicate that this precision has been achieved. If the alignment switches 67 do not indicate that the bottle carriers are precisely in the correct row position relative to the dispensers, the pill dispensers will not be actuated and the conveyer lane will be shut down.

When a selected pill bottle reaches the dispenser containing the pills to be dispensed into that pill bottle as determined by the computer 13 and the bottle carrier position as indicated by the alignment switches is verified, the system will actuate the selected dispenser to release the pills into the corresponding pill bottle. It is contemplated that several bottles including several bottles in the same column will be filled simultaneously.

The ADDS 21 will begin counting out pills with each prescription and accumulate the pills in an output hopper ready to be released en masse to a pill bottle before the pill bottle reaches the pill dispenser containing the pills to be dispensed. This operation is accomplished by beginning the counting of the pills when the pill bottle reaches a position in the ADDS 21 three row positions ahead of the corresponding dispenser position in the ADDS. The computer 13 determines that the pill bottle has reached a pill position three rows in advance of the corresponding dispenser position by comparing the data in the bottle tracking file with the data in the dispenser position data file. When the position index number stored with a prescription identification in the bottle tracking file reaches the value which is three less than the row position indicated for corresponding pill dispenser in the dispenser position data file, the computer 13 will actuate the dispenser to begin counting out the pills of the prescription. If a prescription is to be dispensed from a dispenser located in the first three rows of the ADDS, this fact will be detected upon the pill bottle being loaded into the carrier and the corresponding data being stored in the bottle tracking file and the dispenser position data file. Upon detecting this condition of the pill dispenser for the prescription being located in one of the first three rows of the ADDS 21, the corresponding dispenser in the first three rows will be actuated at that time and, accordingly, begin counting out the pills when the pill bottle is loaded in the bottle carrier.

Figure 6B:
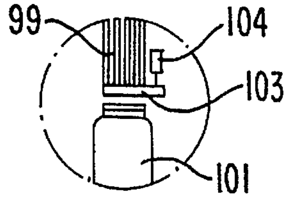

As illustrated in the elevational partial sectional view of a slice shown in FIG. 6*a*, each slice contains 12 pill dispensers, six on each side of the conveyer, with each of the six pill dispensers on the one side of the conveyer being arranged similarly to the arrangement of the pill dispensers in the above-mentioned copending application Ser. No. 08/250,435. As shown in FIG. 6*a*, the 12 pill dispensers each comprise a pill counting cell 77 which is similar to those disclosed in U.S. Pat. Nos. 4,111,332 and 4,869,384 and are marketed under the trademark BAKER CELLS by Automatic Prescription Systems, Inc,. of Pineville, La. In the system of the invention, as in the EDDS disclosed in the copending application Ser. No. 08/250,435, the pill counting cells are fed by supply hoppers 79 and the supply hoppers are each filled with pills through a rear door 81 in a vertical side wall 83 enclosing the ADDS 21. The assembly of the pill counting cells 77, the supply hoppers 79 and the supply doors 81 for each pill dispenser is essentially the same as in the above-mentioned copending application. The dispensing cell 77 of each pill dispenser counts out pills one at a time and the pills fall through an outlet tube 85 into an output hopper 87 called an upper buffer. Each of the upper buffers 87 is in the shape of a tube having its lower end opening closed by an upper buffer gate 89, which is selectively operated by a solenoid 91 and the open or closed position of which is detected by a microswitch (not shown in FIG. 6*a*). When a gate 89 at the bottom of a buffer 87 is open, the pills in the upper buffer 87 will fall into a lower output hopper 93, called lower buffer, of the pill dispenser. Each lower buffer 93 is tubular in shape and has its bottom end closed by a gate 95. The gate 95 may be selectively opened by solenoid 97 and the open or closed position of the gate 95 is detected by a microswitch (not shown in FIG. 6*a*). When the lower buffer gate 95 is open, the pills in the lower buffer 93 fall into an outlet tube 99, which will guide the pills into a prescription bottle 101 positioned below the outlet tube 99. At the bottom of each outlet tube 99 is a redundant outlet gate 103, called a safety gate, which will be actuated by a solenoid 104 whenever the outlet gate 95 for the same pill dispenser is actuated, as shown more clearly in FIG. 6*b*. The safety gates comprise flat paddle shaped plates which pivot about vertical axes and move in their own plane when they pivot between open and closed positions. The purpose of the safety gates 103 is to prevent any stray pills left between the gates 95 and the bottom of the outlet tube 99 from falling into the wrong pill bottle as the pill bottle passes under an outlet tube. The open and closed position of the safety gates 103 are detected by microswitches not shown in FIG. 6*b*.

The operation and control of the pill counting cells 77 and the upper buffer gate 89 to allow the pills to fall to the lower buffer 93 is essentially the same as the corresponding components in the above-mentioned copending application Ser. No. 08/250,435. After a prescription bottle has been placed in a bottle carrier and before the corresponding prescription bottle into which the pill is to be dispensed reaches the dispenser containing pills of the prescription, the control computer 13 causes the pill counting cell 77 containing the selected prescription to count out the number of pills specified in the prescription whereupon the pills will be collected in the upper buffer 87. After the counting out of the pills of the prescription has been completed, the upper buffer gate 89 will be opened unless there is a previously counted out prescription in the lower buffer 93. The control computer 13 keeps track of the counted out prescriptions and will not open the gate 89 if a previously dispensed prescription is still in the lower buffer 93 in the same manner as described in the above-mentioned copending application.

When a prescription bottle reaches the dispenser containing the pills called for the prescription, the computer 13 will open the gates 95 and 103 to dispense the prescription from the lower buffer into the prescription bottle.

As shown in FIG. 7, the slice I/O board used in the ADDS system has been modified slightly from the EDDS slice I/O board as described in the copending application Ser. No. 08/250,435. All communication between the slice I/O board and the control computer 13 is carried out by the microcontroller 105 of the slice I/O board. One slice I/O board controls and responds to six pill dispensers, that is, one-half of a slice on one side of a conveyer lane. The microcontroller 105 communicates with the control computer 13 in data packets, each of which will contain an address potentially identifying and selecting the slice I/O board. Each slice I/O board will receive the data packets transmitted by the control computer 13 over a communications interface 176. The microcontroller 105 in each slice I/O board will compare the address in each received data packet with the unique address identified by an 8-bit address switch 107 and received in a register 109. If the addresses coincide, the microcontroller will then receive and apply the data in the data packet or respond to the request in the data packet from the control computer 13. In response to the data received in the data packet, microcontroller 105 will set values in output registers 111 through 117. The bit positions in the output register 111 severally control the actuation of the upper gate solenoids 91 to open or close the gates 89. The bit positions in output register 112 severally control operation of the lower gate solenoids 97 to open and close the gates 95. The bit positions of the output register 113 severally control operation of the safety gate solenoids 104 to open and close the safety gates 103. The bit positions of output register 115 severally control the operation of solenoids to unlock and lock the replenish doors 81. The bit positions of output register 116 severally control the energization of indicator lamps indicating to resupply technicians which supply hoppers 79 need to be replenished. The bit positions of output register 117 severally control the energization of the cell motors driving the pill counting cells 77.

In response to requests for data received from the control computer 13, the microcontroller 105 will read out the data in the input registers 121 through 127. The bit positions in input register 121 store signals received from sensors in each of the hoppers 79 indicating whether the hopper level is low. The bit positions in input register 122 store signals from the microswitches sensing the position of the upper buffer gates 89 indicating the open or closed position of the upper buffer gates. The bit positions in input register 123 store signals provided by microswitches sensing the position of the lower buffer gates 95 and indicating the open or closed condition of the lower buffer gates 95. The bit positions in input register 124 store signals generated by the microswitches sensing the position of the safety gates 103 indicating the open or closed condition of the safety gates 103. The bit position in input register 125 receive signals from microswitches sensing the closed and locked condition of each of the replenish doors 81 through which the hoppers 79 can be replenished. As in the EDDS system disclosed by copending application Ser. No. 08/250,435, only one of the hopper doors can be opened at any given instant of time. The output pulses from each pill counting cell 77 generated as each pill is dispensed are severally stored in the bit positions of input register 126. The bit positions of register 127 receive signals from the switches indicating that the dispensing cells are present and available to dispense pills in the same manner as in the above-mentioned copending application.

As in the EDDS as described in the above-mentioned copending application, when one or more of the six pill dispensers controlled by a slice I/O board are selected to dispense pills, the microcontroller 105 will receive from the computer 13 the identifications of the selected pill dispensers in the group of six dispensers and the number of pills to be dispensed by each selected dispenser in received data packets. The data for each selected dispenser is stored in the RAM 131 and the microcontroller 105 stores binary ones in the bit positions of the output register 116 corresponding to the selected dispensers. This action will cause the cell motors of the corresponding pill counting cells 77 to be energized and begin to count out pills. As each pill is counted, the pulses generated by the pill counting cell will be stored in the corresponding input register 126 and then be received and counted by the microcontroller 105 in the RAM 131. When the count of pills reaches the number specified in the prescription stored in the RAM 131, the microcontroller 105 will de-energize the cell motor of the corresponding pill counting cell by changing the corresponding bit in the output register 116 back to zero.

With the automatic dispensing system as described above, the bottles are indexed through the automatic dispensing system at a rate of one bottle position for every 9.6 seconds. With four conveyer lanes each containing four columns, the dispensing system potentially can automatically dispense and fill bottles at a rate of 100 prescriptions per minute. Thus, a highly automated and reliable rapid automatic prescription dispensing system is provided by the present invention.

As described above, the preferred embodiment of the invention employs a plurality of conveyer lanes, each of which carries four columns of bottles to an array of pill dispensers arranged in four columns. It will be apparent that the principles of the invention are applicable to the operation of a single conveyor lane. Moreover, the system could be adapted to operate on a single column of bottles passing under a single column of pill dispensers.

These and other modifications of the preferred embodiment of the invention may be made without departing from the spirit and scope of the invention which is defined in the appended claims.

We claim:

1. An automatic prescription dispensing system comprising a multiplicity of pill dispensers in one conveyer line, each of said dispensers defining a fill position and each being operable to dispense pills into a pill bottle in the fill position of such dispenser, the fill positions of said dispensers being arranged in columns and rows, a conveyer comprising means to carry pill bottles arranged in columns and rows, carrying the columns of pill bottles severally through the columns of fill positions so that each pill bottle in a column passes through fill positions to receive pills from each pill dispenser of a corresponding column, control means to selectively predetermine each of said pill bottles to receive a specific prescription and operable to simultaneously release the pills of different prescriptions into selected pill bottles from said pill dispensers, each pill bottle receiving the pills of a prescription when the pill bottle predetermined to receive such prescription reaches a fill position of a pill dispenser containing the pills of such prescription, said pill dispensers being controlled by said control means to release the number of pills called for in said prescriptions.

2. An automatic prescription dispensing system as recited in claim 1, wherein said pill bottles are predetermined to receive selected prescriptions by being placed in predetermined locations on said conveyer.

3. An automatic prescription dispensing system as recited in claim 1, wherein said conveyer comprises means to carry a multiplicity of pill bottle carriers in sequence past said pill dispensers, said bottle carriers each comprising means to receive and carry a plurality of bottles arranged in columns and rows.

4. An automatic prescription dispensing system as recited in claim 1, wherein said pill dispensers each have an output buffer and are controlled by control means to release the number of pills called for in such prescriptions by counting out the number of pills of such prescriptions into the output buffers and releasing the pills from said output buffers into said pill bottles.

5. An automatic prescription dispensing system as recited in claim 4, wherein each of said pill dispensers has an upper output buffer and a lower output buffer, said pill dispensers counting said pills out one at a time into said upper output buffer, then releasing the pills from said upper output buffer into said lower output buffer, then temporarily storing the pills in said lower output buffer, and then releasing the pills from said lower output buffer into a pill bottle.

6. An automatic prescription dispensing system as recited in claim 1, wherein said control means controls said pill dispensers to each accumulate the pills of a prescription to be dispensed in an output buffer prior to the pill bottle into which such prescription is to be dispensed reaching the fill position of such dispenser on said conveyer.

7. An automatic prescription dispensing system as recited in claim 1, wherein said control means controls dispensers having fill positions in the same column to release the pills of a plurality of prescriptions into pill bottles simultaneously.

8. An automatic prescription dispensing system comprising a multiplicity of pill dispensers in one conveyer line, each of said dispensers defining a fill position and each being operable to dispense pills into a pill bottle in the fill position of such dispenser, the fill positions of said dispensers being arranged in a column, a conveyer arranged to carry a column of pill bottles through said fill positions bringing each pill bottle in said column through each of said fill positions in sequence so that at a given time a plurality of said pill bottles will be in a different one of said fill positions, control means to selectively predetermine each of said pill bottles to receive a specific prescription and operable to simultaneously release pills of different prescriptions into said pill bottles from said pill dispensers, each pill bottle receiving the pills of a prescription when such pill bottle reaches a fill position of a pill dispenser containing pills of such prescription, said pill dispensers being controlled by said control means to release the number of pills called for in said prescriptions.

9. An automatic prescription dispensing system as recited in claim 8, wherein said pill bottles are predetermined to receive selected prescriptions by being placed in predetermined positions on said conveyer.

10. An automatic prescription dispensing system as recited in claim 8, wherein said conveyer comprises means to carry a multiplicity of bottle carriers in sequence past said pill dispensers, said bottle carriers each comprising means to receive and carry a plurality of bottles arranged in a column.

11. An automatic prescription dispensing system as recited in claim 8, wherein said pill dispensers each have an output buffer and are controlled by control means to release the number of pills called for in such prescriptions by counting out the number of pills of such prescriptions into the output buffers and releasing the pills from said output buffers into said pill bottles.

12. An automatic prescription dispensing system as recited in claim 11, wherein each said pill dispenser has an upper output buffer and a lower output buffer, said pill dispensers counting out said pills one at a time into said upper output buffer, and releasing the pills from said upper output buffer into said lower output buffer, then temporarily storing the pills in said lower output buffer, and then releasing the pills from said lower output buffer into a pill bottle.

13. An automatic prescription dispensing system as recited in claim 8, wherein said control means controls said pill dispensers to each accumulate the pills of the prescription to be dispensed in an output buffer prior to said pill bottle into which said prescription is to be dispensed reaching the fill position of such dispenser on said conveyer.

14. An automatic prescription dispensing system as recited in claim 8, wherein said control means controls said dispensers to release the pills of a plurality of prescriptions into pill bottles simultaneously.

15. An automatic prescription dispensing system as recited in claim 8, wherein each of said dispensers has an output conduit through which pills are released into an open pill bottle in the fill position of such dispenser, said outlet conduit each having a downwardly facing open outlet end, and a selectively operative gate to open and close the outlet end of each of said conduits maintaining said outlet end closed except when said dispenser is operated to release pills into a pill bottle positioned beneath said outlet end.

16. An automatic prescription dispensing system, comprising a multiplicity of pill dispensers in a single conveyer line, each conveyer line comprising means to carry pill bottles past said pill dispensers so that said pill bottles pass through positions to receive pills from said pill dispensers, control means to selectively predetermine each of said pill bottles to receive a specific prescription and operable to simultaneously release pills of different prescriptions into selected pill bottles from said pill dispensers, each pill bottle receiving pills of a prescription when the pill bottle predetermined to receive such prescription reaches the pill dispenser containing the pills of such prescription, said pill dispensers being controlled by said control means to release the number of pills called for in said prescriptions, said conveyer comprising means to carry a multiplicity of pill bottle carriers in sequence past said pill dispensers, said bottle carriers each comprising means to receive and carry a plurality of bottles in a predetermined arrangement.

* * * * *